United States Patent
Rabaut et al.

(10) Patent No.: US 11,473,330 B2
(45) Date of Patent: Oct. 18, 2022

(54) DEVICE AND METHOD FOR UPENDING A TUBULAR ELEMENT WITH A LONGITUDINAL DIRECTION FROM A SUPPORT SURFACE AT AN OUTER END

(71) Applicant: DEME Offshore BE NV, Zwijndrecht (BE)

(72) Inventors: Dieter Wim Jan Rabaut, Ghent (BE); Kenneth Gerard Vannieuwenhuyse, Sint-Amandsberg (BE); Jan Maria Koen Michielsen, Antwerp (BE)

(73) Assignee: DEME Offshore BE NV, Zwijndrecht (BE)

( * ) Notice: Subject to any disclaimer, the term of this patent is extended or adjusted under 35 U.S.C. 154(b) by 0 days.

(21) Appl. No.: 17/262,825

(22) PCT Filed: Jul. 22, 2019

(86) PCT No.: PCT/EP2019/069667
§ 371 (c)(1),
(2) Date: Jan. 25, 2021

(87) PCT Pub. No.: WO2020/020817
PCT Pub. Date: Jan. 30, 2020

(65) Prior Publication Data
US 2021/0310270 A1 Oct. 7, 2021

(30) Foreign Application Priority Data

Jul. 26, 2018 (BE) .................................. 2018/5541

(51) Int. Cl.
*E04H 12/34* (2006.01)
*B66C 1/56* (2006.01)
*F03D 13/25* (2016.01)

(52) U.S. Cl.
CPC ............. *E04H 12/345* (2013.01); *B66C 1/56* (2013.01); *F03D 13/25* (2016.05); *F05B 2230/6102* (2013.01); *F05B 2240/95* (2013.01)

(58) Field of Classification Search
CPC ......... E04H 12/345; B66C 1/108; B66C 1/56; B66C 23/185; F03D 13/25; F03D 13/10;
(Continued)

(56) References Cited

U.S. PATENT DOCUMENTS

| 4,683,832 | A | * | 8/1987 | Dysarz | ................. | B63B 35/003 |
| | | | | | | 405/209 |
| 8,313,266 | B2 | * | 11/2012 | Numajiri | ................ | F03D 13/10 |
| | | | | | | 405/195.1 |

(Continued)

FOREIGN PATENT DOCUMENTS

| CN | 106744312 A | 5/2017 |
| CN | 106948644 A | 7/2017 |

(Continued)

*Primary Examiner* — Carib A Oquendo
(74) *Attorney, Agent, or Firm* — The Webb Law Firm

(57) ABSTRACT

Described herein is a device for upending a tubular element with a longitudinal direction from a support surface at an outer end. The device has a support beam which runs substantially parallel to the support surface and is connected to the support surface at a support point. The support beam guides a coupling tool to which a wall part of an outer end of the tubular element can be coupled. The coupling tool is displaceable relative to the support surface with the support beam, from a clear position to a coupled position in which the tubular element outer end is engaged by the coupling tool. Also described herein, in addition to the device, is a method which makes use of the device.

20 Claims, 13 Drawing Sheets

(58) Field of Classification Search
CPC .......... F05B 2230/6102; F05B 2240/95; F05B 2230/61; B63B 35/003; B63B 27/16; E02B 2017/0091; E02B 2017/0039; E02B 2017/0043; E02B 2017/0065
See application file for complete search history.

(56) References Cited

U.S. PATENT DOCUMENTS

| | | | |
|---|---|---|---|
| 10,239,733 B2 | 3/2019 | Belder et al. | |
| 2005/0286979 A1* | 12/2005 | Watchorn | B63B 35/003 |
| | | | 405/203 |
| 2010/0143046 A1* | 6/2010 | Olsen | E02B 17/00 |
| | | | 405/209 |
| 2011/0123274 A1 | 5/2011 | Soe-Jensen | |
| 2011/0200425 A1* | 8/2011 | Weaver | B66C 23/207 |
| | | | 29/469 |
| 2011/0271608 A1 | 11/2011 | Egan et al. | |
| 2015/0016939 A1* | 1/2015 | Moeller | F03D 13/10 |
| | | | 294/81.61 |
| 2016/0068373 A1 | 3/2016 | Chin et al. | |
| 2016/0327018 A1 | 11/2016 | Botwright | |
| 2020/0308796 A1* | 10/2020 | Vehmeijer | F16L 1/207 |
| 2020/0347960 A1* | 11/2020 | Roodenburg | F03D 13/25 |
| 2021/0047009 A1* | 2/2021 | Roodenburg | B63B 35/00 |
| 2021/0123203 A1* | 4/2021 | Rabaut | E02B 17/00 |
| 2021/0215139 A1* | 7/2021 | Roodenburg | F03D 13/25 |

FOREIGN PATENT DOCUMENTS

| | | | |
|---|---|---|---|
| CN | 108104577 A | 6/2018 | |
| EP | 2719578 A2 | 4/2014 | |
| NL | 2018377 A | 3/2017 | |
| WO | 2006080850 A1 | 8/2006 | |
| WO | 2010006602 A2 | 1/2010 | |
| WO | 2016184905 A1 | 11/2016 | |
| WO | WO-2018117846 A1 * | 6/2018 | ............. E02D 13/04 |

* cited by examiner

DEVICE AND METHOD FOR UPENDING A TUBULAR ELEMENT WITH A LONGITUDINAL DIRECTION FROM A SUPPORT SURFACE AT AN OUTER END

CROSS-REFERENCE TO RELATED APPLICATIONS

This application is the United States national phase of International Application No. PCT/EP2019/069667 filed Jul. 22, 2019, and claims priority to Belgian Patent Application No. 2018/5541 filed Jul. 26, 2018, the disclosures of which are hereby incorporated by reference in their entirety.

BACKGROUND OF THE INVENTION

Field of the Invention

The invention relates to a device and method for upending a tubular element with a longitudinal direction from a support surface at an outer end. The invention relates particularly to a device and method for upending a foundation pile of a wind turbine to be placed on an underwater bottom and/or a wind turbine tower to be placed on an already installed foundation from the work deck of a vessel at an outer end. The foundation can here comprise a so-called monopile foundation or a so-called jacket foundation.

Description of Related Art

The invention will be elucidated with reference to an offshore wind turbine. This reference does not however imply that the invention is limited thereto, and the device and method can be applied equally well for placing any other tubular element on any ground surface. It is thus for instance possible to apply the invention in the context of arranging other offshore foundation structures, of jetties, radar and other towers, and also for onshore applications.

Foundation piles of an offshore wind turbine in many cases comprise hollow tubular elements of steel or concrete which can have lengths of more than 100 m, a diameter of 6 m and more, and a weight which can rise to 800-2300 tons and more. Foundations for wind turbines are moreover becoming increasingly heavier because wind turbines are constantly being scaled up. Because the foundations are becoming increasingly more sizeable, they are increasingly more difficult to handle.

A known method for placing a foundation pile on an underwater bottom comprises of taking up the foundation pile from a vessel with a lifting means such as a lifting crane and lowering the foundation pile onto or into the underwater bottom. The foundation pile is then uncoupled from the lifting means.

Taking up of a foundation pile is a delicate operation, among other reasons because the foundation pile can easily become damaged herein. It is important here to consider that the foundation pile may protrude over the deck of a vessel over a large distance, and that distances between a device for take-up and the foundation pile are generally very small relative to for instance the diameter of the foundation pile, so that undesired contact between a device for take-up and wall parts of the foundation pile can easily occur. Various operators are furthermore active in operation of the tools used, such as the lifting crane, winches provided on the deck of the vessel, and the like.

A drawback of the known device is that there is a high chance of damage to a tubular element to be upended, such as a foundation pile. The known device is also only able to perform its function when the sea is relatively calm, and is generally only suitable for a limited diameter range of a tubular element.

SUMMARY OF THE INVENTION

An object of the present invention is therefore to provide a device and method for upending a tubular element with a longitudinal direction from a support surface at an outer end, which help to at least partially obviate the above stated prior art drawbacks. The invention particularly seeks to provide an improved device and method for upending a tubular element with a longitudinal direction, particularly a foundation pile of a wind turbine to be placed on an underwater bottom and/or a wind turbine tower to be placed on an already installed foundation, at an outer end.

According to the invention, a device is provided for this purpose. The device comprises a support beam which runs substantially parallel to the support surface and is connected to the support surface at a support point, wherein the support beam guides a coupling tool configured for coupling to a wall part of an outer end of the tubular element, and wherein the coupling tool is displaceable relative to the support surface with the support beam, from a clear position to a coupled position in which the tubular element outer end is engaged by the coupling tool.

Because the support beam is connected to the support surface at a support point, and a tubular element to be upended is positioned, directly or indirectly on the support surface, within reach of the support beam during use, the tubular element and the support beam provided with the coupling tool undergo substantially the same movements as the support surface. The coupling tool can hereby be coupled to an outer end of the tubular element without much risk of damage. This is done by displacing the coupling tool from a clear position to a coupled position, in which the tubular element outer end can be or is engaged by the coupling tool.

The device thus ensures that a tubular element can be taken up and upended, particularly from a rocking vessel, with less chance of damage.

In an embodiment of the invention a device is provided wherein the support beam is rotatable round the support point and the coupling tool round the support beam, round a rotation axis running perpendicularly of the support surface. This embodiment facilitates the positioning of the coupling tool relative to the outer end to be engaged.

According to an embodiment, a further improved device is provided with a coupling tool which can be translated along the support beam.

Another embodiment provides a device, this comprising here two support beams which run substantially parallel to the support surface and are connected at support points to the support surface, and which are placed at an intermediate distance from each other such that a tubular element to be upended can be positioned between and parallel to the support beams, wherein the support beams guide the coupling tool, and wherein the coupling tool can be translated relative to the support surface in the longitudinal direction of a tubular element positioned between the support beams, from the clear position to the coupled position. It is also possible to provide a device comprising here only one support beam which runs parallel to the support surface and is connected at support points to the support surface. Such a support beam then preferably takes a heavier form in order to be able to guide the coupling tool.

In the context of the present description of the invention the term "substantially" is understood to mean more than 80% of the indicated value or property, more preferably more than 85%, still more preferably more than 90%, and also 100%.

Another aspect of the invention relates to a method for upending a tubular element with a longitudinal direction from a support surface at an outer end. The method comprises the steps of positioning a tubular element to be upended parallel to the support surface, this within reach of a support beam which runs substantially parallel to the support surface and is connected to the support surface at a support point; displacing a coupling tool, which is configured for coupling to a wall part of an outer end of the tubular element, relative to the support surface under guidance of the support beam, wherein the coupling tool is displaced from a clear position to a coupled position; and engaging of the tubular element outer end by the coupling tool for the purpose of coupling.

The way in which the coupling tool can be displaced relative to the support surface to the coupled position can in principle be chosen freely. According to an embodiment of the device, it is thus possible to provide support beams which are connected to the support points for translation in the longitudinal direction of a tubular element positioned between the support beams. A coupling tool guided by the support beams can then be displaced by displacement of the support beams. In an embodiment the coupling tool can here be fixedly connected to the support beams.

In another embodiment a device is applied in which the support beams are fixedly connected to the support points. In an embodiment the coupling tool can here be connected translatably to the support beams.

In yet another embodiment the support beam is rotated round the support point and the coupling tool round the support beam, round a rotation axis running perpendicularly of the support surface. If desired, the coupling tool can here also be translated along the support beam.

The device is particularly suitable for upending tubular elements of a relatively large size, for instance with diameters of 6 m and more, and with lengths which can amount to 80 m and more. An embodiment provides for this purpose a device wherein the coupling tool comprises a lifting member for connection to a lifting means such as a crane. In this embodiment a tubular element coupled to the coupling tool can be taken up and upended by the lifting member of the coupling tool. In another embodiment the device can for this purpose further comprise a lifting means supported by the support surface for taking up the coupling tool by the lifting member. A suitable lifting means comprises for instance a lifting crane of any known type.

The support surface for the lifting means can comprise a ground surface, soil, a concrete plate and so on. The device is particularly suitable for upending tubular elements offshore, for which purpose the support surface comprises a work deck of a floating vessel. In this embodiment the device is manipulated from a work deck of a vessel, for instance a jack-up platform. The advantages of the invention are most clearly manifest when the support surface comprises a work deck of a floating vessel suitable for lifting heavy objects.

The coupling tool and/or the support beam(s) can in principle be embodied for displacement, rotation and/or translation relative to the support surface in any manner known to the skilled person. A practical embodiment provides a device wherein the coupling tool and/or the support beams are displaceable, rotatable and/or translatable relative to the support surface by means of hydraulic piston cylinders extending between the coupling tool and/or the support beams, and the support surface. Other means for translating the coupling tool and/or the support beam(s) relative to the support surface can comprise a rack and gear system, or a winch system, or combinations of such means.

The support beam(s) according to the invention are preferably relatively light and strong, at least to be able to collectively guide and/or carry the coupling tool. A suitable embodiment comprises a device wherein the support beam(s) comprise a lattice structure. If desired, the support point connected to the support surface can also be embodied as lattice structure.

An embodiment wherein the support beam(s) are configured to carry substantially only the coupling tool is preferred because this embodiment is as light as possible and requires a minimum of material. The auxiliary means, such as the means for translating the support beams, can also take a relatively light form. In such an embodiment the coupling tool can be moved to the clamping position under guidance of and/or carried by the support beams. Once coupled to a tubular element, the weight of said element can if desired be taken up by a lifting means connected to the coupling tool and/or tubular element.

The invented device can in principle be applied in combination with any suitable coupling tool for a tubular element. Such coupling tools are configured to engage an outer end of a tubular element so as to then upend said element at the outer end with a suitable lifting means. The coupling between the coupling tool and the element outer end can be based on any coupling principle, and for instance be brought about by friction coupling and/or flange coupling.

A preferred embodiment of the device relates to a coupling tool comprising a cross-shaped support structure of mutually coupled beams; a lifting member, connected pivotally to the support structure, for connection to a lifting means such as a crane; and clamping members slidable along the beams from a clear position to a clamping position for coupling to a wall part of the outer end of the tubular element in the clamping position, in which clamping position the beams extend substantially transversely of the longitudinal direction of the tubular element.

In an embodiment of the invention the clamping members are slidable from the clear position to a clamping position, located further away from a centre of the cross of the support structure than the clear position, for coupling to an internal wall part of a hollow outer end of the tubular element. Providing the option of sliding the clamping members from the clear position to the clamping position enables tubular elements of varying diameters to be engaged and upended without the device having to be modified for this purpose. The device particularly enables tubular elements with relatively large diameters to be upended. In the context of the present application relatively large diameter is understood to mean a diameter greater than 6 m, more preferably greater than 7 m, still more preferably greater than 8 m, still more preferably greater than 9 m, and most preferably greater than 10 m.

The coupling of the slidable clamping members to a wall part of the tubular element can in principle comprise any type of coupling. Suitable couplings for instance comprise a friction coupling or a flange coupling, or a combination of the two. A friction coupling is based on generating friction forces between surfaces of a clamping member and a relevant wall part on which the clamping member engages by pressing the two surfaces together. A flange coupling can be based on a bolt connection between flanges of a clamping member and a relevant wall part on which the clamping member engages. A better flange coupling can be obtained by embodying the clamping members such that they can slide under a flange of the tubular element so that a mechanical flange coupling results.

In an embodiment a peripheral part of the element can be engaged by the clamping members with a suitable clamping tension during upending of the element. Because the clamping members are for instance situated relatively close to the centre of the cross-shaped support structure during insertion of the device into a hollow outer end of the tubular element, damage is less likely to be done. This also makes it possible, if desired, to work in a heavier swell than is possible with the prior art method.

Yet another embodiment provides a device which further comprises support members, connected to the beam, for a wall part of the tubular element. Such members can be helpful in supporting a tubular element while it is being upended counter to the force of gravity. The support members are preferably applied for upending tubular elements with a relatively large diameter, and are instrumental in avoiding overload of the tubular element.

The clamping members of the support structure can in principle be situated on an upper or lower side, or both sides of the support structure. A practical embodiment relates to a device wherein the lifting member is situated on an upper side of the cross-shaped support structure for connection to the lifting means, and the clamping members are slidable along a lower side of the support structure.

The clamping members of the support structure can in principle be slidable along the beams of the support structure in any manner known to the skilled person. A relatively low-maintenance embodiment relates to a device wherein the clamping members are slidable by means of hydraulic piston cylinders extending between a clamping member and the support structure.

Because the device has for its object to at least partially prevent damage to tubular elements to be upended at sea, another embodiment of the invention is formed by a device wherein surfaces which can come into contact with wall parts of the tubular element are provided with shock-absorbing elements such as rubber covering. These surfaces can for instance be end surfaces of the clamping members, of the support members and/or of the support structure in some embodiments.

The advantages of the device according to the invention are most clearly manifest in an embodiment wherein the tubular element is a foundation pile of a wind turbine and/or a wind turbine tower to be placed on an already installed foundation.

With the device a tubular element with a longitudinal direction can be upended at an outer end thereof with a reduced chance of damage. A tubular element to be upended is here positioned substantially parallel to the support surface between two support beams which run substantially parallel to the support surface and are connected to the support surface at support points; a coupling tool is translated relative to the support surface in the longitudinal direction of the tubular element positioned between the support beams, from a clear position to a coupled position, under guidance of the support beams; and the tubular element outer end is engaged by the coupling tool for the purpose of coupling.

The method further preferably comprises of taking up the coupling tool with the tubular element outer end coupled thereto with a lifting means for the purpose of upending; and, optionally, of lifting the tubular element coupled to the device into a desired position. Afterwards, the coupling tool can be uncoupled from the tubular element outer end.

Another aspect of the invention relates to an assembly of a device according to any one of the described embodiments and a tubular element coupled to such a device.

The embodiments of the invention described in this patent application can be combined in any possible combination of these embodiments, and each embodiment can individually form the subject-matter of a divisional patent application.

BRIEF DESCRIPTION OF THE DRAWINGS

The invention will now be further elucidated on the basis of the following figures, without otherwise being limited thereto. In the figures.

DESCRIPTION OF THE INVENTION

Figure 1:
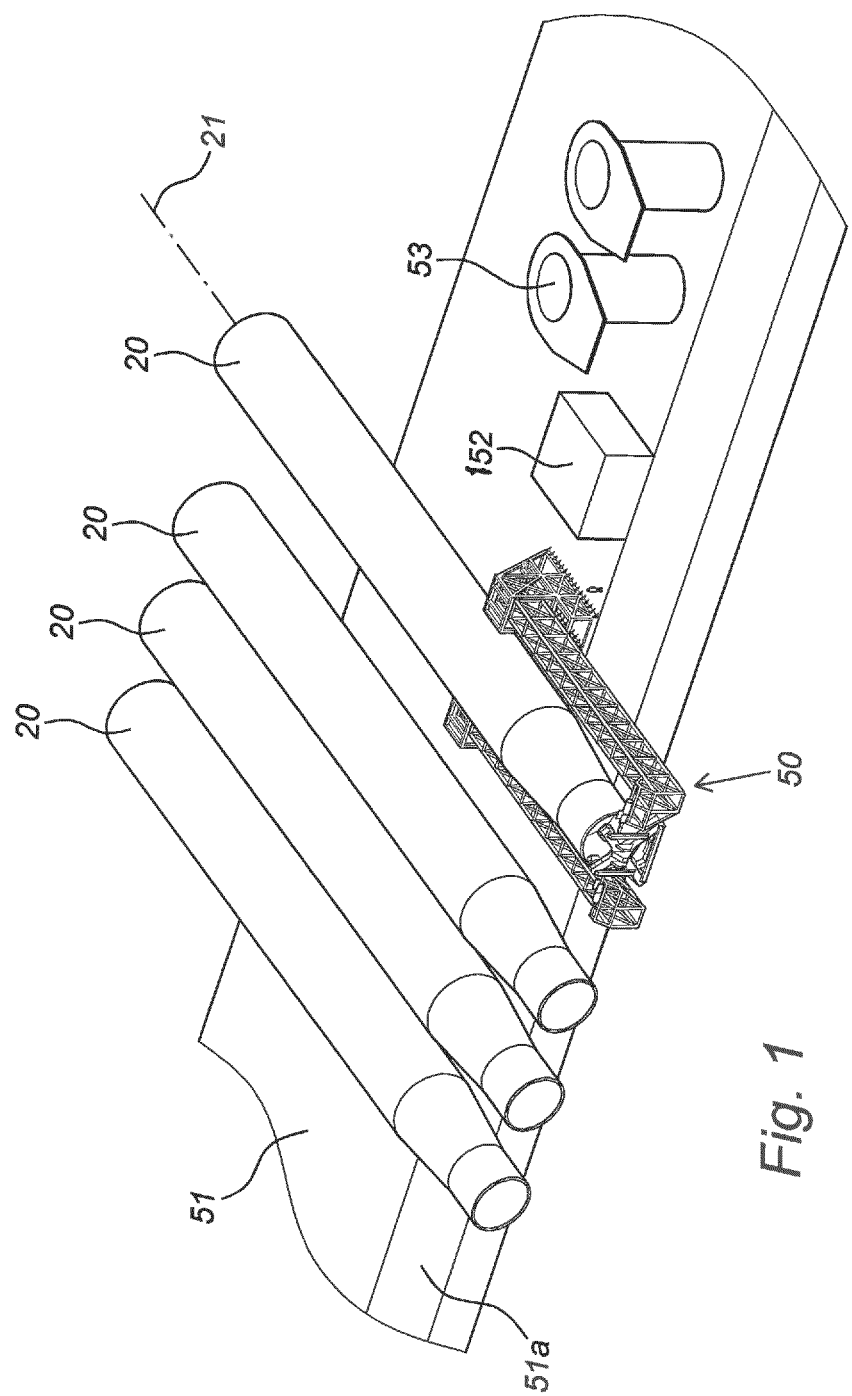
FIG. 1 is a schematic perspective view of a device according to an embodiment of the invention.

According to FIG. 1, a device 50 is shown for upending a foundation pile 20 of an offshore wind turbine from a support surface, for instance a work deck 51 of a jack-up platform, at an outer end 200. Work deck 51 has a vertical side wall 51a which debouches in a water mass. Foundation pile 20 has a longitudinal direction 21. In the shown embodiment a plurality of foundation piles 20 is placed in horizontal position on work deck 51. Other components necessary for the installation of foundation piles 20 and/or wind turbine tower can also be present on work deck 51, such as a housing 152 for connecting umbilicals and transition pieces for connecting a wind turbine tower to a placed foundation pile 20.

Figure 2:
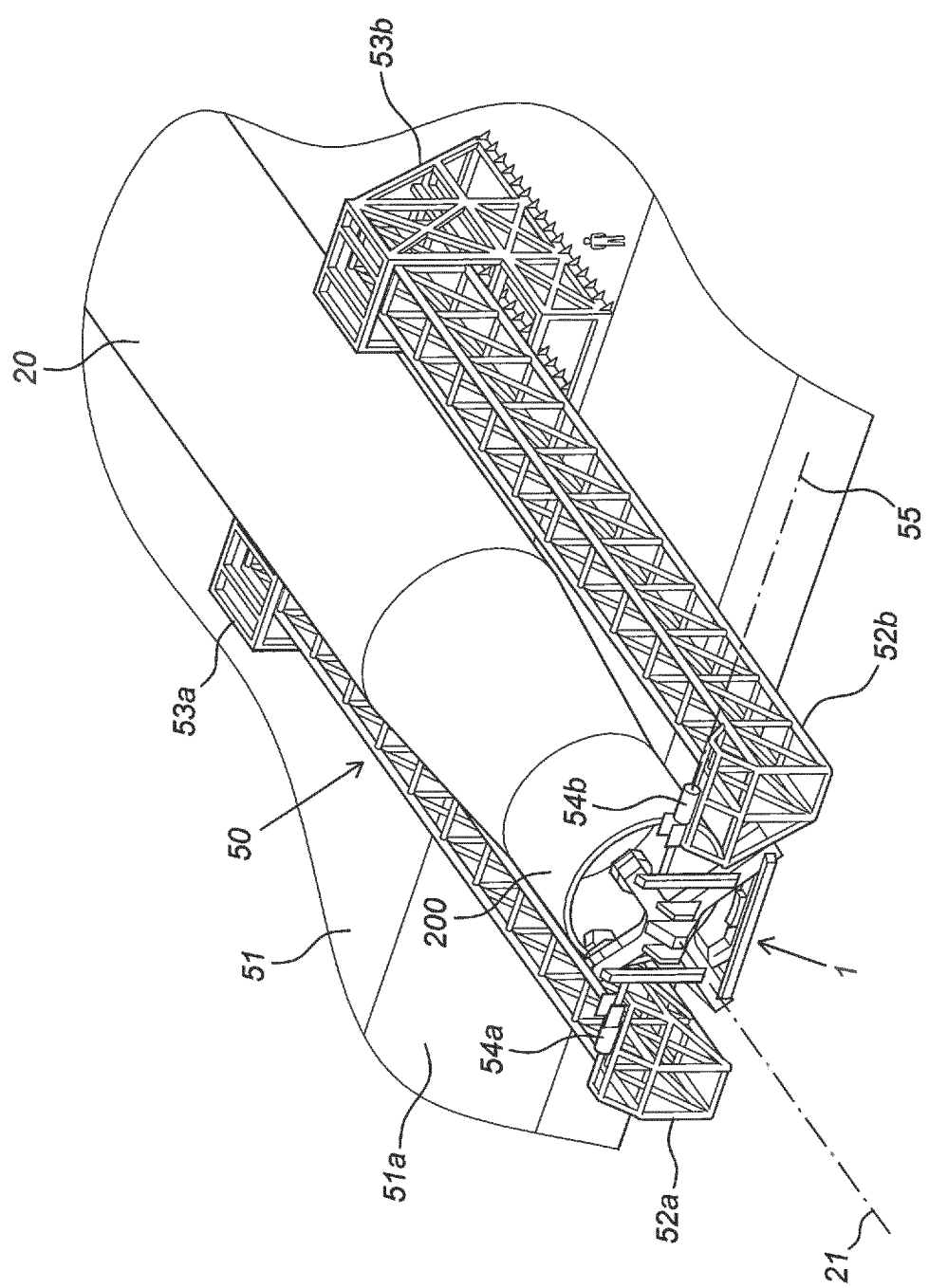
FIG. 2 is a schematic perspective detail view of the embodiment shown in FIG. 1.

According to the detail view of FIG. 2, the shown device 50 comprises two support beams (52a, 52b) which run substantially parallel to support surface 51 and are connected fixedly to support surface 51 at support points (53a, 53b). The support beams (52a, 52b)—and the support points (53a, 53b)—are embodied as a lattice structure in order to obtain sufficient strength and rigidity at the lowest possible weight. In the shown embodiment the two support beams (52a, 52b) are dimensioned such that they can both carry substantially only a coupling tool 1.

This coupling tool 1, a possible embodiment of which will be further discussed below in more detail, is configured for coupling to a wall part 20a of an outer end 200 of a foundation pile 20, and in the shown embodiment is connected fixedly to a free outer end of each support beam (52a, 52b) by means of connecting rods (54a, 54b) which are welded onto the lattices and engage on ribs of coupling tool 1. Coupling tool 1 is here received between the support beams (52a, 52b). It is possible to embody the connection (54a, 54b) such that coupling tool 1 can rotate round a horizontal axis 55, although this is not essential. It is also possible to embody the connection (54a, 54b) such that coupling tool 1 is connected to the support beams (52a, 52b) for translation in the longitudinal direction 21.

Figure 5:
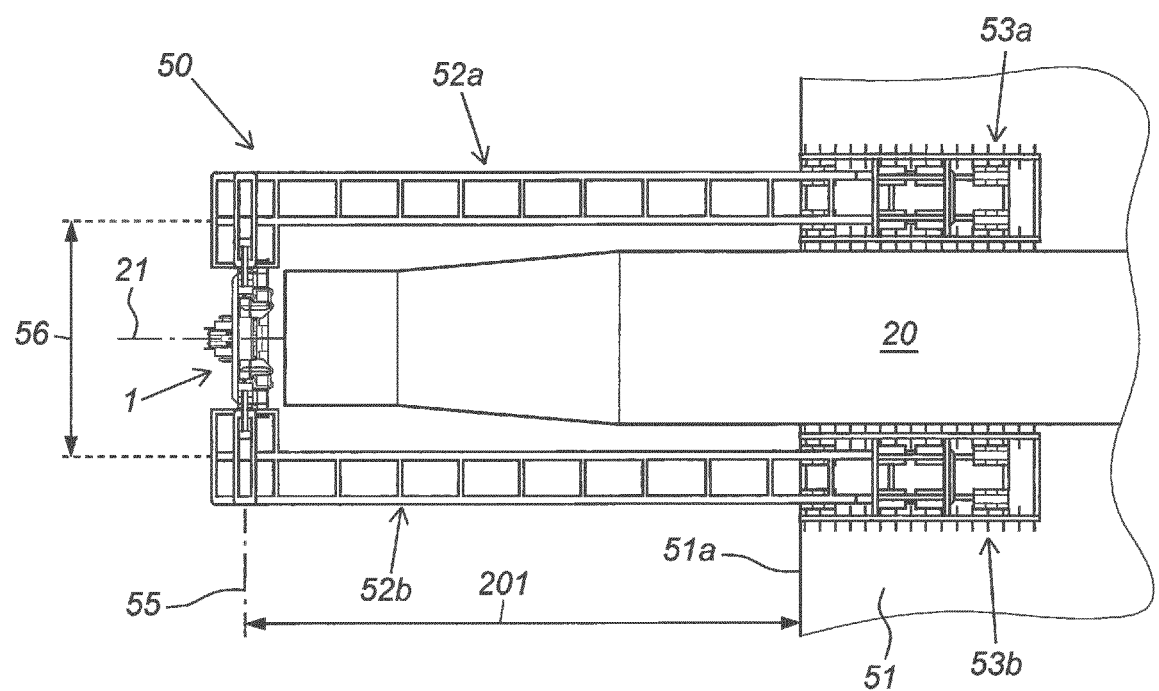
FIG. 5 is a schematic top view of the embodiment of the device according to the invention shown in FIG. 1 in extended state.
Figure 6:
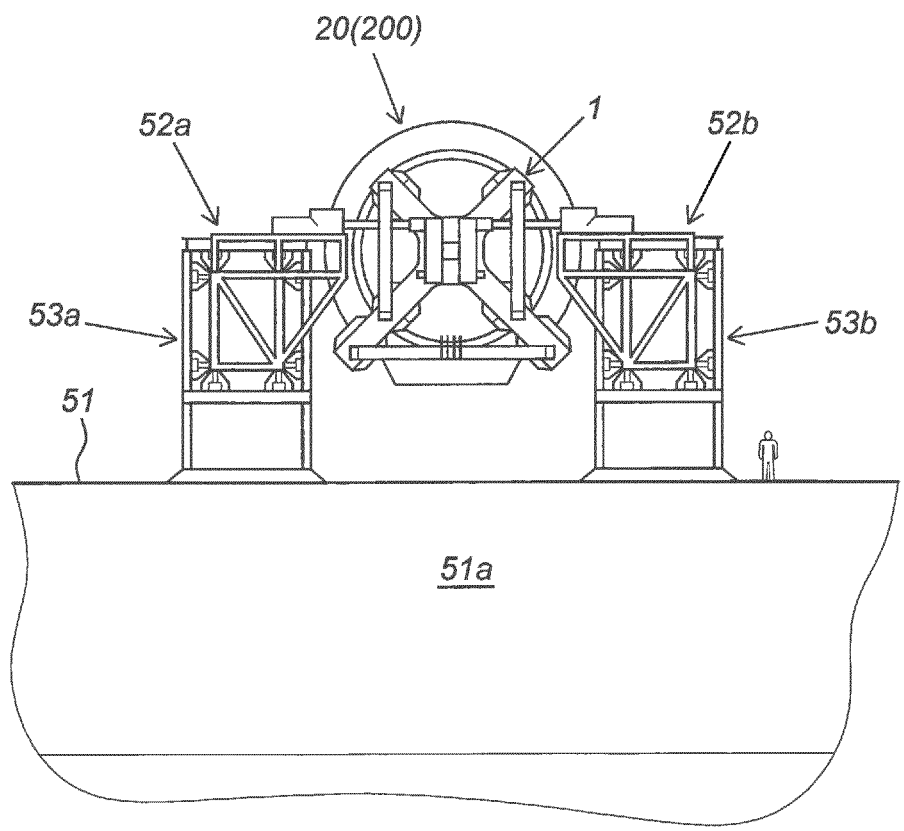
FIG. 6 is a schematic front view of the embodiment shown in FIG. 1.
Figure 7:
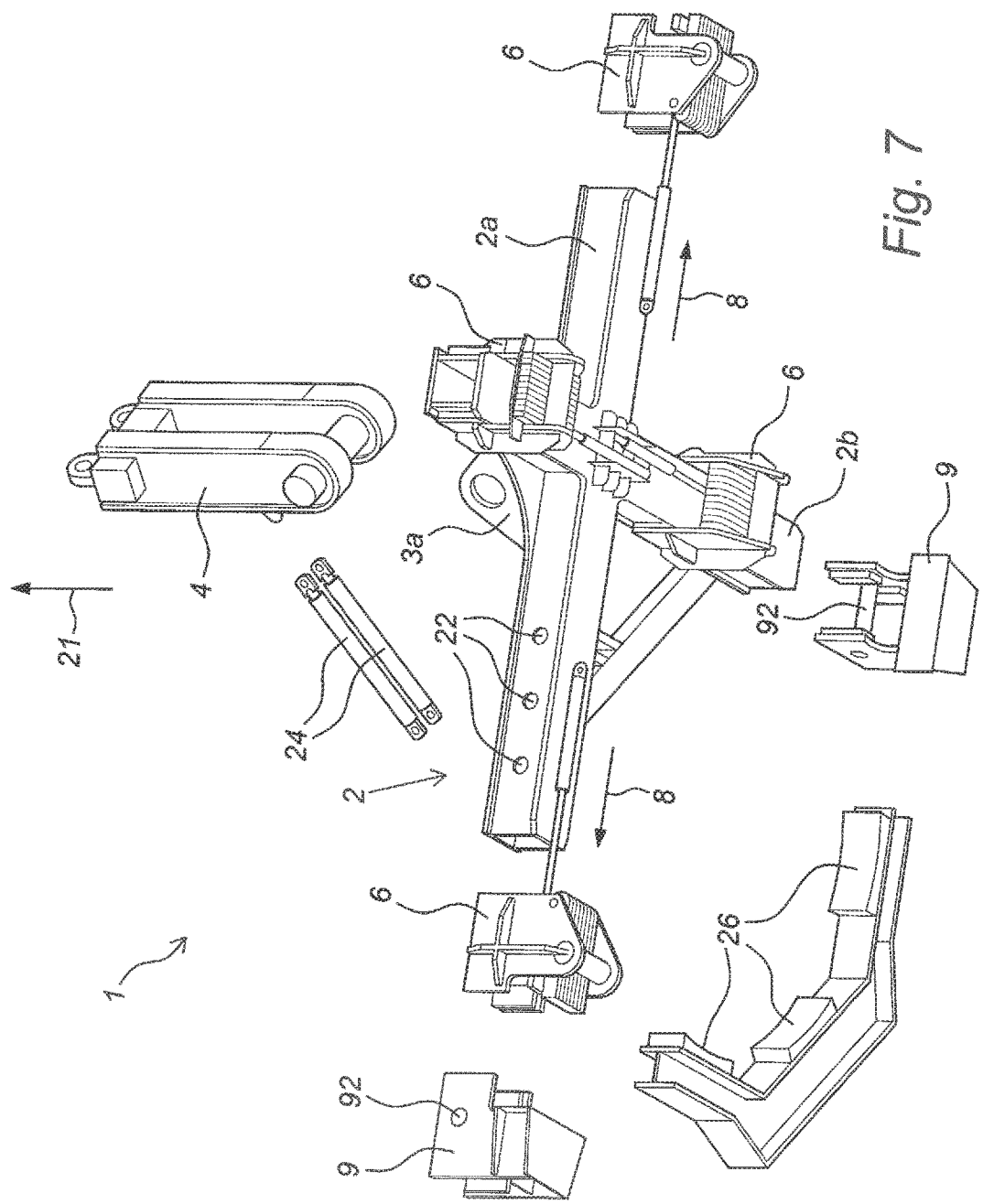
FIG. 7 is a schematic perspective exploded view of a coupling tool according to an embodiment of the invention.
Figure 8:
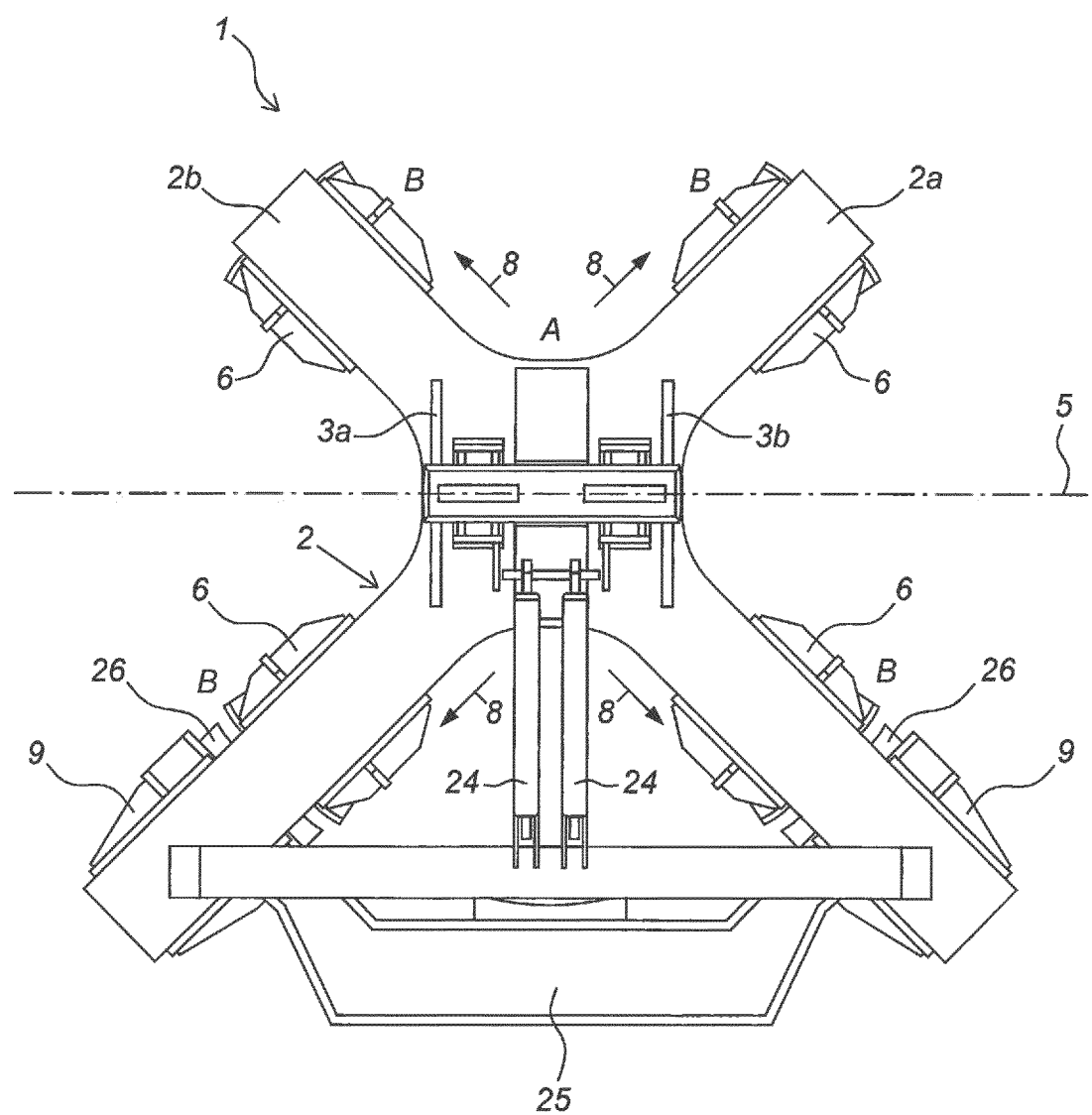
FIG. 8 is a schematic top view in assembled state of the embodiment of the coupling tool shown in FIG. 7.

As shown in FIG. 5, the support beams (52a, 52b) are placed at a horizontal intermediate distance 56 from each other such that a foundation pile 20 to be upended can be positioned between and substantially parallel to (a longitudinal direction of) the support beams (52a, 52b). The support beams (52a, 52b) are further connected translatably to the support points (53a, 53b) in a manner such that they can be displaced relative to the support points (53a, 53b) in the longitudinal direction 21 of a foundation pile 20 positioned between the support beams (52a, 52b). Because coupling tool 1 is fixedly connected to the support beams (52a, 52b), this coupling tool 1 will in use also translate relative to support surface 51 in the longitudinal direction 21 of a foundation pile 20 positioned between the support beams (52a, 52b), this from a clear position in which coupling tool 1 leaves the outer end 200 of foundation pile 20 clear, to a coupled position, shown in FIG. 3, in which the outer end 200 of foundation pile 20 is engaged by coupling tool 1. A possible manner of engaging will be further described hereinbelow.

The translation of coupling tool 1 and/or the support beams (52a, 52b) relative to work deck 51 can take place in any known manner, for instance by means of hydraulic piston cylinders extending between coupling tool 1 and/or the support beams (52a, 52b) and work deck 51, and more specifically by means of hydraulic piston cylinders extending between coupling tool 1 and/or the support beams (52a, 52b) and the support points (53a, 53b) of work deck 51.

The support points (53a, 53b) can have a dual function. On the one hand they connect the support beams (52a, 52b) to work deck 51, and on the other hand they provide a support surface for a foundation pile 20 to be upended from a horizontal position shown in the figures. This support is for instance visible in FIGS. 3 and 4, and comprises a number of beam elements which form part of the lattice and which can be provided with rubber shock-absorbing elements 57 in order to prevent wall parts of foundation pile 20 from becoming damaged. The support of foundation pile 20 by the support points (53a, 53b) ensures among other things that a foundation pile 20 arranged between the support beams (52a, 52b) does not come into contact with work deck 51. This is otherwise not essential, and in other embodiments there may be contact between a foundation pile 20 and work deck 51. It is also possible to likewise make the support points (53a, 53b) movable relative to work deck 51. In such an embodiment the device 50 can be moved to foundation piles 20, or other tubular elements, present on work deck 51 or other support surface. This prevents unnecessary displacement of foundation piles 20 or other tubular elements.

Referring to FIGS. 7-11, a coupling tool 1 for upending a foundation pile 20 with a longitudinal direction 21 at an outer end is shown. Coupling tool 1 is likewise suitable for upending and placing other elements with a longitudinal direction, such as for instance transition pieces of a wind turbine mast, optionally on each other or on another surface. In the shown embodiment coupling tool 1 comprises a cross-shaped support structure in the form of mutually coupled beams (2a, 2b). The support structure can however also comprise a plurality of beams, for instance three beams which form the legs of a Y-shaped support structure. The coupling can for instance be brought about by means of welding of beam parts. The beams for instance have a tubular cross-section, although H-beams or I-beams are also possible. In the centre of the cross the support structure is provided with two hinged plates (3a, 3b) in which a lifting member 4 is connected pivotally to support structure 2 by means of a pin-hole connection. Lifting member 4 is provided on a lifting side with lifting eyes 40 for connection to a lifting means such as a crane (not shown), this with interposing of hoisting cables, each of these engaging in a lifting eye 40. The function of lifting eye 40 can also take a different form, for instance that of shaft stub or trunnion. With lifting member 4 coupling tool 1 can be suspended from a lifting means in a manner such that support structure 2 can rotate in relatively unhindered manner round a rotation axis 5 running perpendicularly of the hinged plates (3a, 3b).

Figure 9:
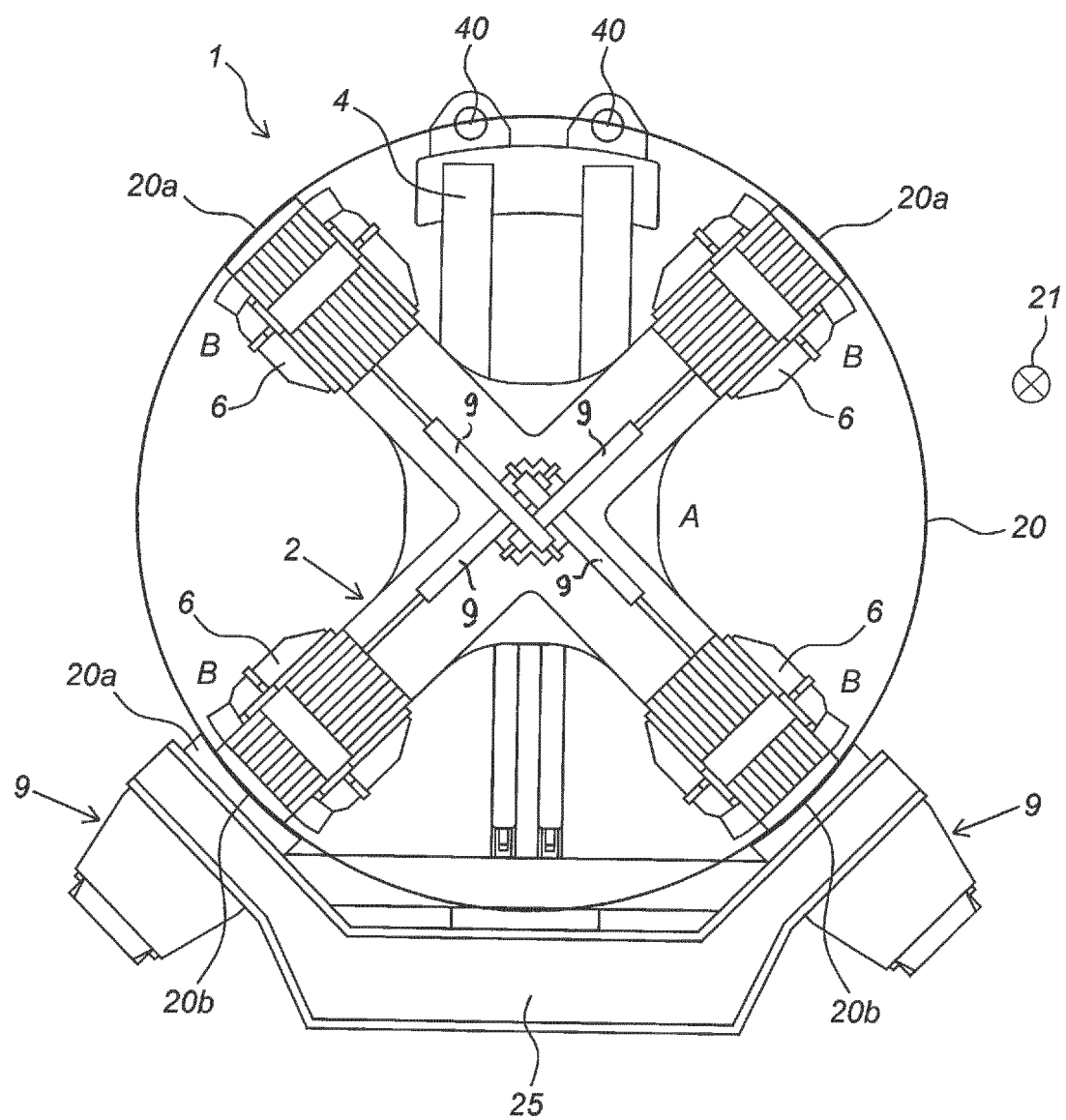
FIG. 9 is a schematic top view of the embodiment of the coupling tool shown in FIG. 8 with a tubular element friction-coupled thereto.
Figure 10:
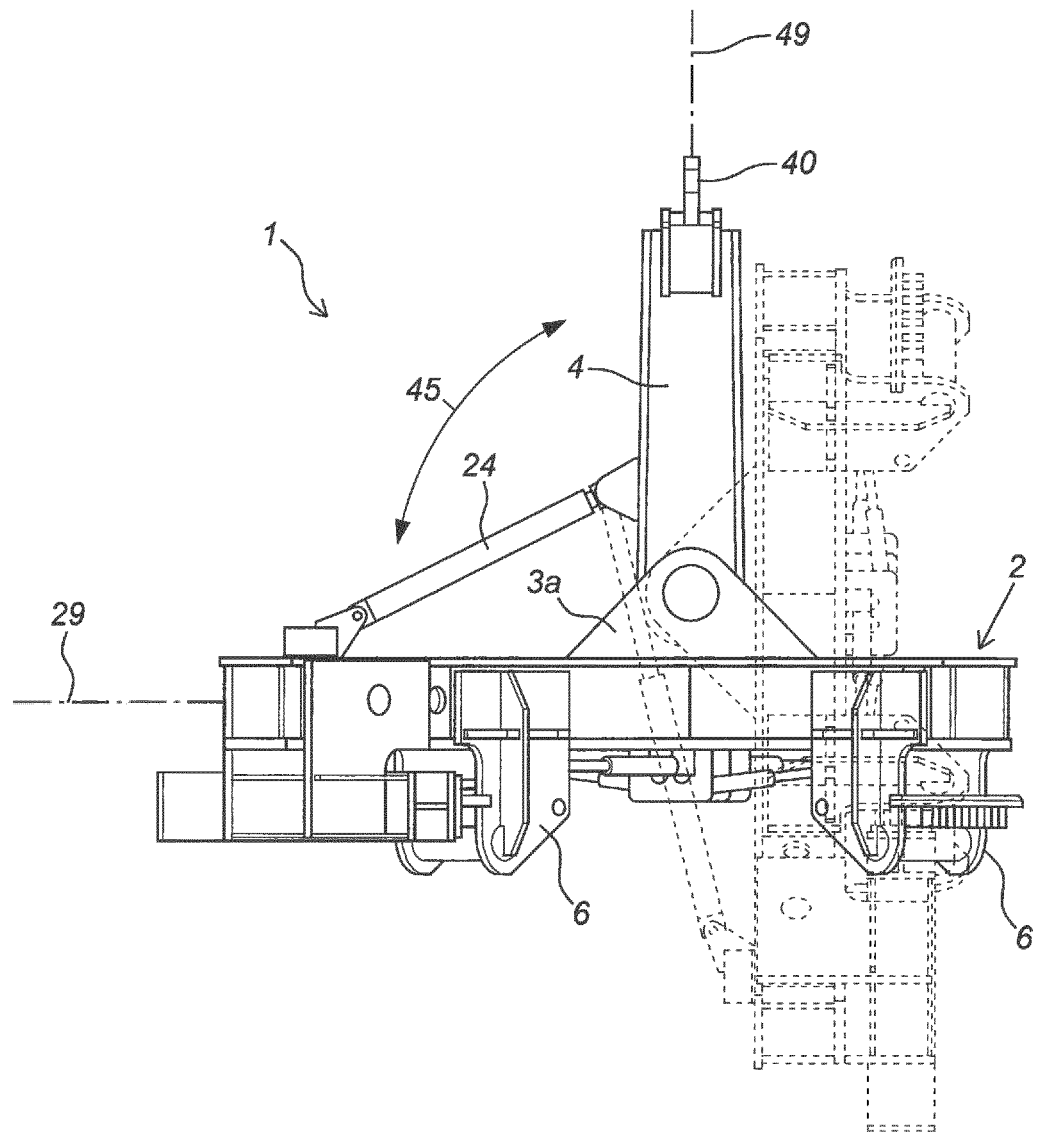
FIG. 10 is a schematic side view of the embodiment of the coupling tool shown in FIG. 7 in two angular positions.
Figure 11:
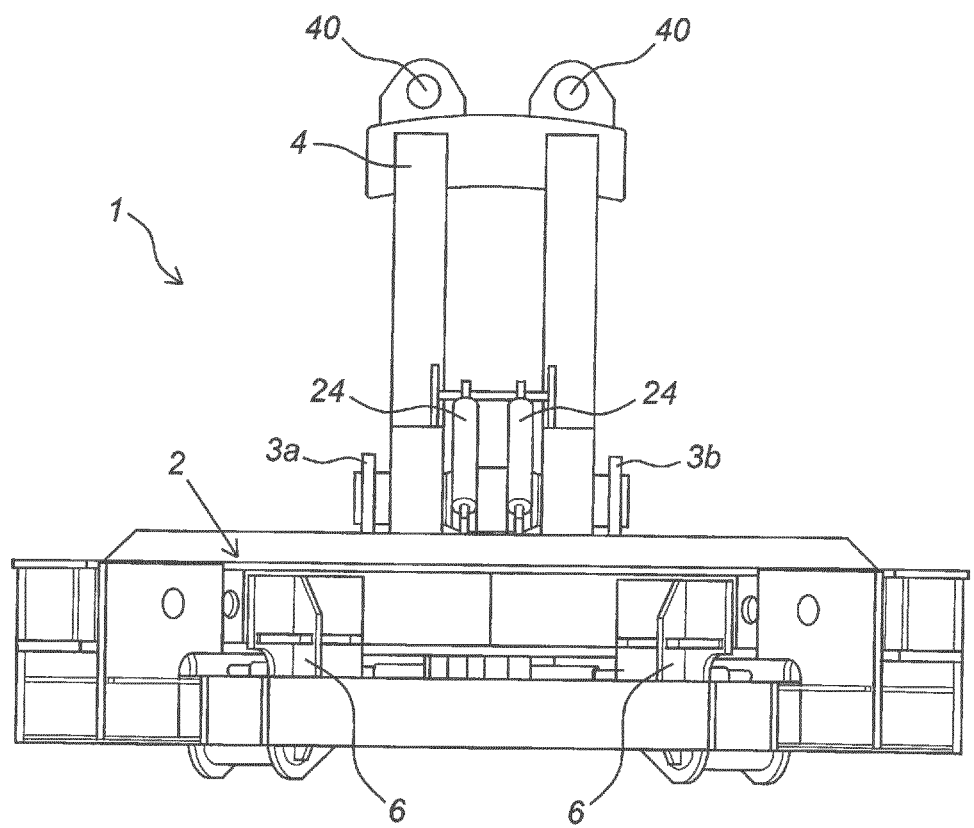
FIG. 11 is a schematic side view of the embodiment of the coupling tool according to the invention shown in FIG. 7.

Coupling tool 1 further comprises clamping members 6 slidable along the beams (2a, 2b) from a clear position to a clamping position. Each camping member 6 has a U-shaped cross-section and can in this way at least partially enclose a beam (2a, 2b) so that clamping member 6 is able to slide with sliding surfaces over the relevant beam (2a, 2b) without losing contact with the beam (2a, 2b). In the shown embodiment clamping members 6 are slidable along a lower side of support structure 2. The lower side of support structure 2 is defined here as the side where lifting member 4 is not situated. This lifting member 4 is situated on an upper side of the cross-shaped support structure 2. Clamping members 6 can be slid over the beams (2a, 2b) by means of hydraulic piston cylinders 7 extending between a relevant clamping member 6 and a beam of support structure 2. By imparting on the cylinders a radially outward movement in the indicated direction 8 as according to FIG. 8 the clamping members 6 are moved from a clear position A lying radially relatively close to the centre of the cross to a clamping position B located further away from the centre of the cross of the support structure. As shown in FIG. 9, in the clamping position B clamping members 6 lie under pressure against internal wall parts 20a of a hollow outer end of foundation pile 20, wherein a clamping member part is slid under a flange or protruding edge (not shown) of the foundation pile. This results in a mechanical coupling, optionally combined with a friction coupling between end surfaces of clamping members 6 and the internal wall parts 20a of foundation pile 2. In order to further improve this coupling the end surfaces of clamping members 6 which come into contact with wall parts 20a can be provided with shock-absorbing elements such as rubber covering. The figures further show that in the clamping position of clamping members 6 the beams (2a, 2b) extend substantially transversely of a longitudinal direction 21 of foundation pile 20. In FIG. 9 the longitudinal direction 21 runs perpendicularly of the plane of the figure.

Coupling tool 1 is further provided with support members 9 connected to a beam (2a, 2b). Support members 9 are configured to support outer wall parts 20b of foundation pile 20, at least along parts of the periphery of foundation pile 20. Support members 9 likewise have a U-shaped cross-section and can be slid over end parts of the beams (2a, 2b) to an adjustable fixed position of the relevant beam (2a, 2b). The adjustable fixed positions are for instance determined by a number of openings 22 which are arranged in a side wall of a beam (2a, 2b) and in which a corresponding pin 92 of a support member 9 can be arranged in order to secure this member to the beam (2a, 2b). Because support members 9 are configured to support an outer wall part 20b of foundation pile 20 during upending, support members 9 will generally be situated more radially outward in the radial direction 8 than clamping members 6, which are after all configured in the shown embodiment to clamp an inner wall part 20a of foundation pile 20 during upending.

Figure 3:
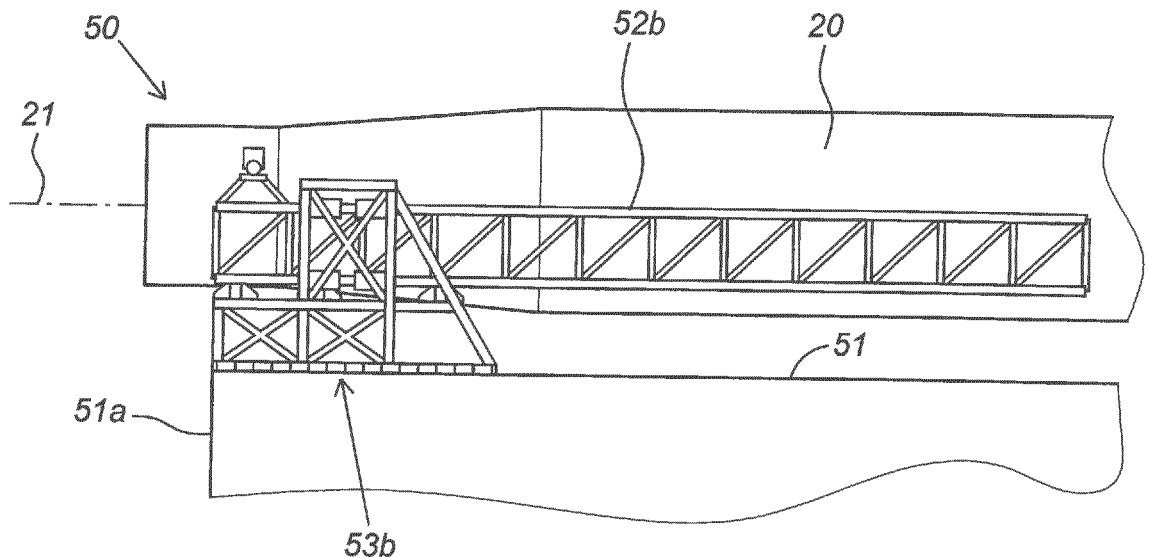
FIG. 3 is a schematic side view of the embodiment of the device according to the invention shown in FIG. 1 in retracted state.
Figure 4:
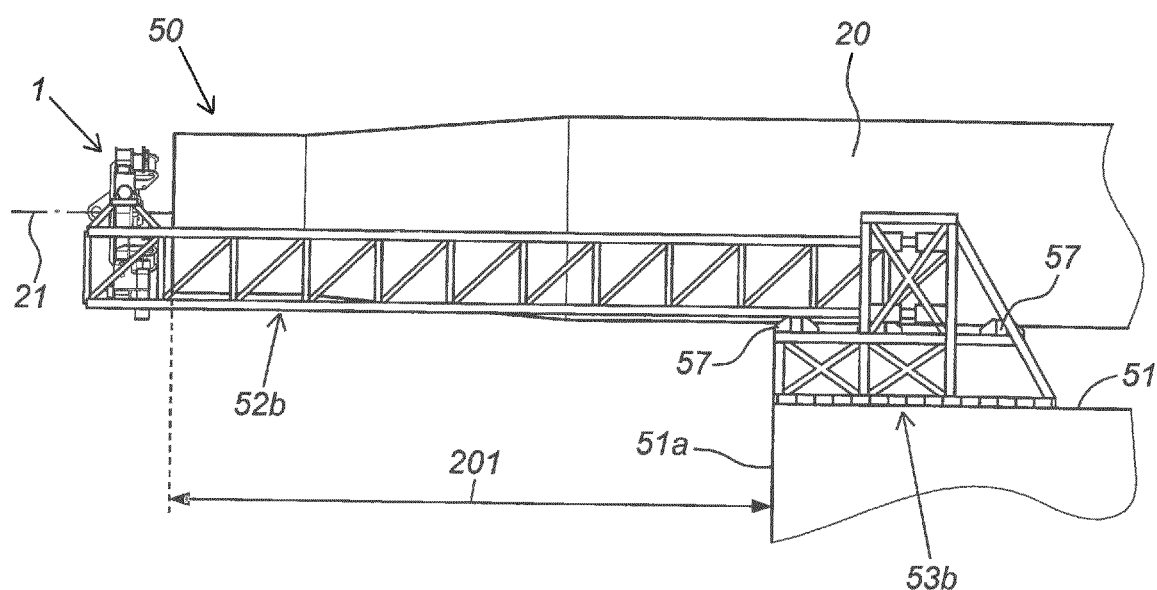
FIG. 4 is a schematic side view of the embodiment of the device according to the invention shown in FIG. 1 in extended state.

For foundation piles 20 with relatively large diameters, for instance of 6 m and more, and/or a relatively high weight, for instance 800-2300 tons and more, it may be useful to provide further support in the form of a support structure 25, which differs from support members 9 and extends along at least a part 23 of the periphery of foundation pile 20. In order to obtain sufficient strength it may be useful to connect support structure 25 to at least two beams (2a, 2b), as shown in FIGS. 2 and 3. The surfaces of support structure 25 which can come into contact with wall parts of foundation pile 20 can also be provided with shock-absorbing elements 26, for instance in the form of rubber covering.

During use, when foundation pile 20 is being upended, both support members 9 and support structure 25 are situated on a lower side of foundation pile 20 in partially upended position. Support members 9 and, if desired, support structure 25, are therefore particularly useful in absorbing the own weight of foundation pile 20.

Finally, coupling tool 1 can also be provided with means for adjusting the angular position of support structure 2 relative to the lifting member 4 which is connected pivotally to support structure 2. In the shown embodiment the angle adjusting means comprise hydraulic piston cylinders 24 extending between lifting member 4 and support structure 2. In the retracted position of cylinders 24, shown in FIG. 10, the plane 29 of support structure 2 runs substantially perpendicular to the plane 49 of lifting member 4. In this lifting position the angle 45 between the two planes of lifting member 4 and support structure 2 amounts to substantially 90 degrees. By imparting a movement on cylinders 24 the support structure 2 is rotated round rotation axis 5 to an insertion position, shown with broken lines in FIG. 10, in which plane 29 of support structure 2 runs substantially parallel to the plane of lifting member 4. The angle 45 between lifting member 4 and support structure 2 has here increased to about 180 degrees.

With the above described embodiments of device 50 a foundation pile 20 can be upended from work deck 51 at outer end 200. A foundation pile 20 to be upended is here first positioned parallel to work deck 51, this between the two support beams (52a, 52b) running substantially parallel to work deck 51. A relatively large part 201 of foundation pile 20 can here protrude over the edge 51a of work deck 51. Under guidance of the support beams (52a, 52b), coupling tool 1 is then displaced relative to work deck 51 in the longitudinal direction 21 of the foundation pile 20 positioned between the support beams (52a, 52b), from a clear position shown in FIGS. 4 and 5, in which foundation pile 20 is not engaged, to a coupled position shown in FIG. 3, in which the coupling tool engages the outer end 200 of foundation pile 20.

Foundation piles 20 which have to be upended and for instance have to be arranged in a seabed are generally situated on work deck 51 in horizontal position. In order to lift such a horizontally oriented foundation pile 20 with coupling tool 1 the support structure 2 of the coupling tool is moved into the insertion position shown with broken lines in FIG. 10, and inserted into a hollow outer end of foundation pile 20, by imparting a movement on cylinders 24. Clamping members 6 are here in the clear position A, i.e. relatively close to the centre of the cross. Damage to wall parts of foundation pile 20 is prevented in this way. Clamping members 6 are then slid along the beams (2a, 2b) from their clear position A to their clamping position B, wherein a friction coupling with the internal wall parts 20a of the hollow outer end of foundation pile 2 is realized. In this clamping position the beams (2a, 2b) extend substantially transversely of the longitudinal direction of foundation pile 20.

Coupling tool 1 is then connected to a hoisting cable (not shown) of a crane (not shown) by connecting the hoisting cable to the eyes 40 or alternative connecting means of lifting member 4. The foundation pile 20 coupled to coupling tool 1 is then upended by hoisting the whole with the crane. Support structure 2 can here optionally pivot relative to lifting member 4 until angle 45 has been reduced to 90 degrees, in other words until plane 29 of support structure 2 runs substantially perpendicular to plane 49 of lifting member 4. In this position the foundation pile 20 coupled to coupling tool 1 is hoisted with the crane into a desired position, for instance there where foundation pile 20 has to be lowered onto the seabed. In the desired position clamping members 6 are then slid radially inward along the beams (2a, 2b) from clamping position B to clear position A in order to uncouple coupling tool 1 from foundation pile 20. During upending of foundation pile 20 it can if desired be supported further by support members 9 and/or support structure 25.

Another embodiment of the invention is shown in FIGS. 12-16. As far as the numbering in FIGS. 12-16 is the same as in FIGS. 1-6, the same elements are designated therewith. According to FIG. 12, a device 150 is shown for upending a foundation pile 20 of an offshore wind turbine from a work deck 51 of a jack-up platform at an outer end 200. In the shown embodiment a plurality of foundation piles 20 is placed on work deck 51 in horizontal position.

Figure 12:
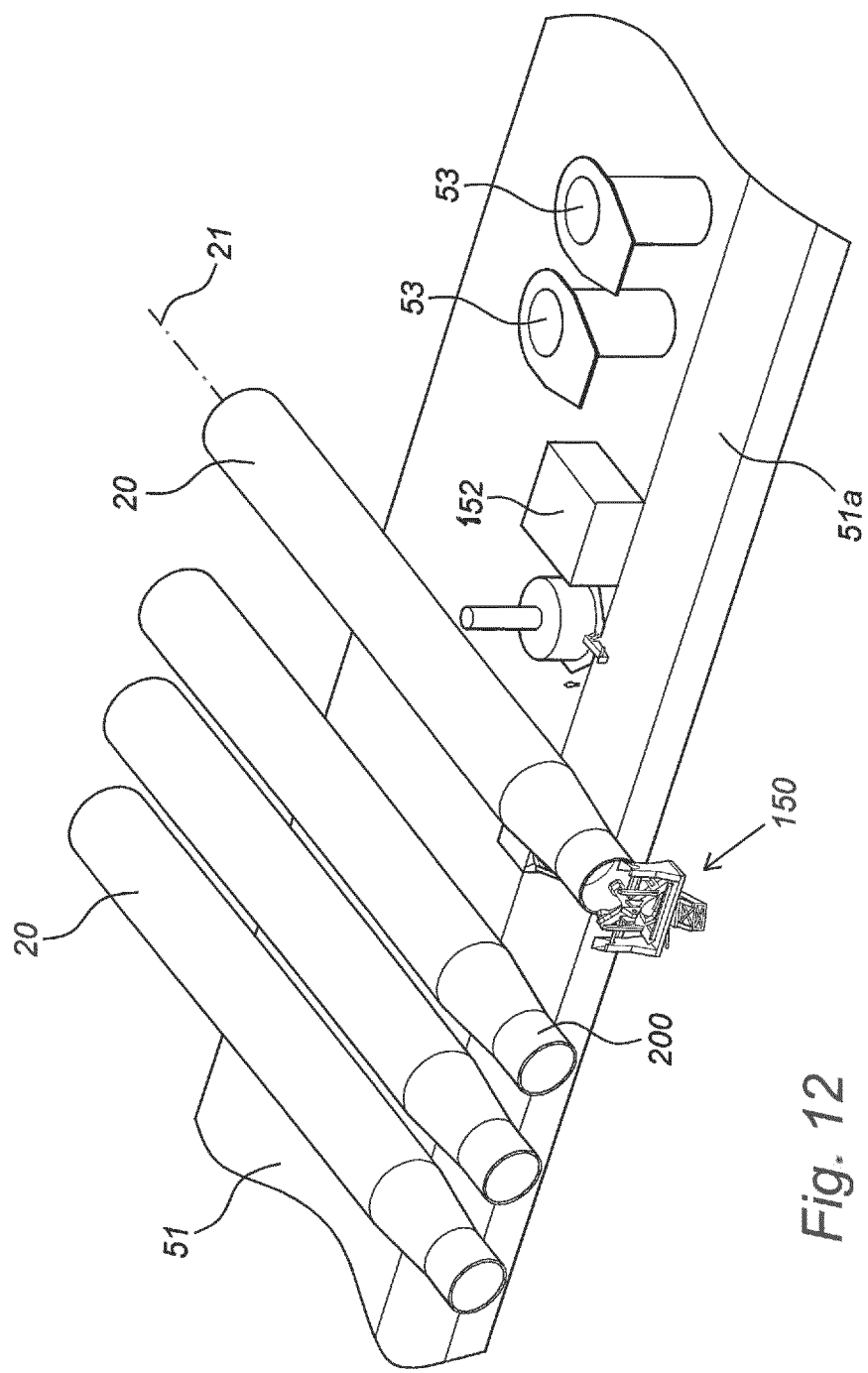
FIG. 12 is a schematic perspective view of a device according to another embodiment of the invention.
Figure 13:
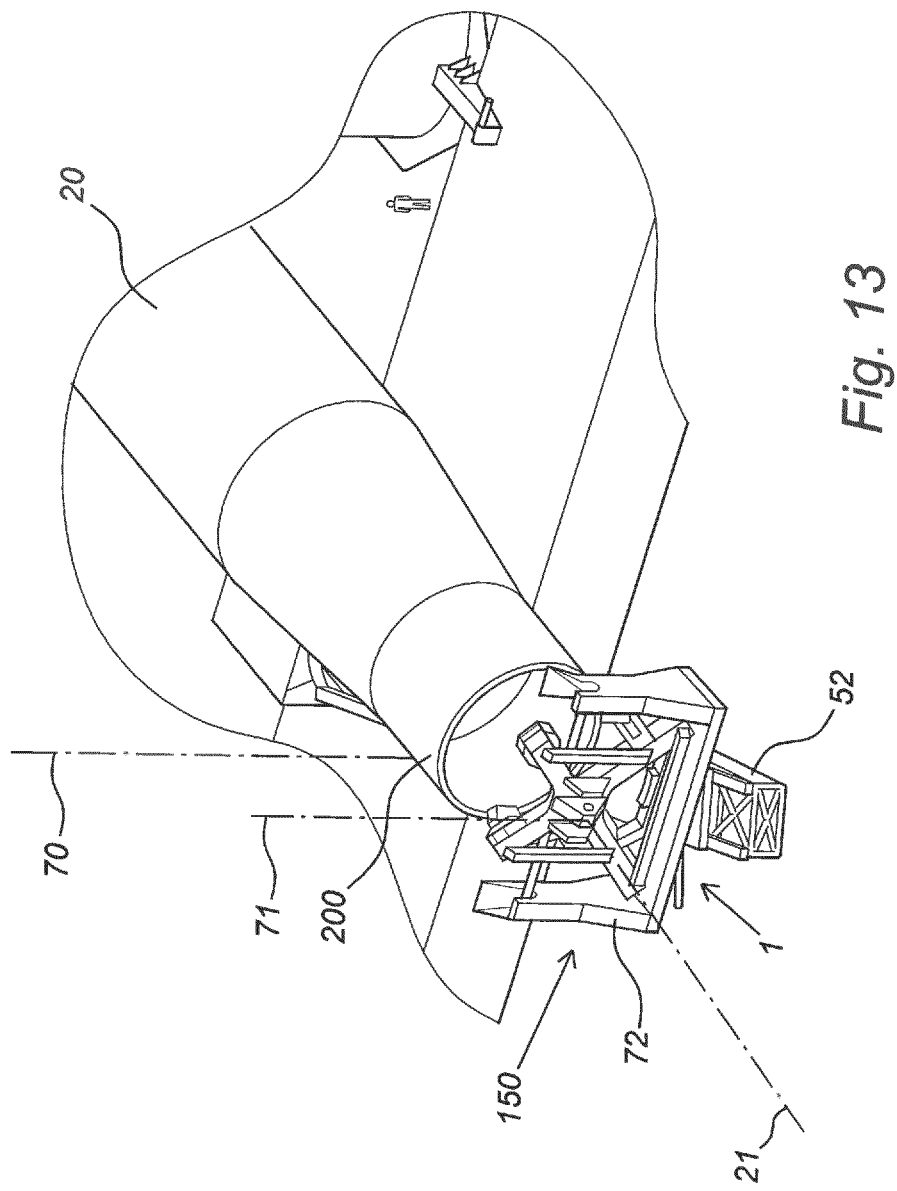
FIG. 13 is a schematic perspective detail view of the embodiment shown in FIG. 12.
Figure 14:
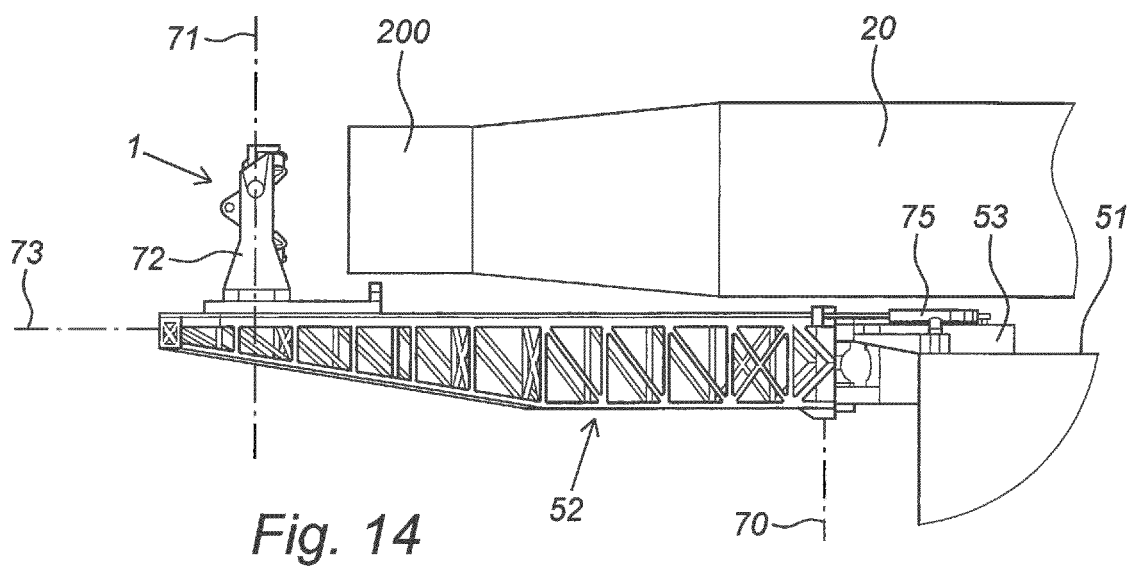
FIG. 14 is a schematic side view of the embodiment of the device according to the invention shown in FIG. 12 in outward-rotated state.

According to the detail view of FIG. 12, the shown device 150 comprises a support beam 52 which runs substantially parallel to support surface 51 (so substantially horizontally) and which is connected to support surface 51 at a support point 53 for rotating round an axis 70 running perpendicularly of work deck 51. Support beam 52 is embodied as a lattice structure in order to obtain sufficient strength and rigidity at the lowest possible weight. In the shown embodiment support beam 52 is dimensioned such that it can carry substantially only a coupling tool 1.

This coupling tool 1, which has already been described in detail above, is in this embodiment connected to a free outer end of support beam 52 for rotation round a vertical axis 71 by means of a hinge which engages on a frame 72 of coupling tool 1. As can be clearly seen in FIG. 15, coupling tool 1 is further connected to the support beam for translation in the longitudinal direction 73 of support beam 52.

Figure 15:
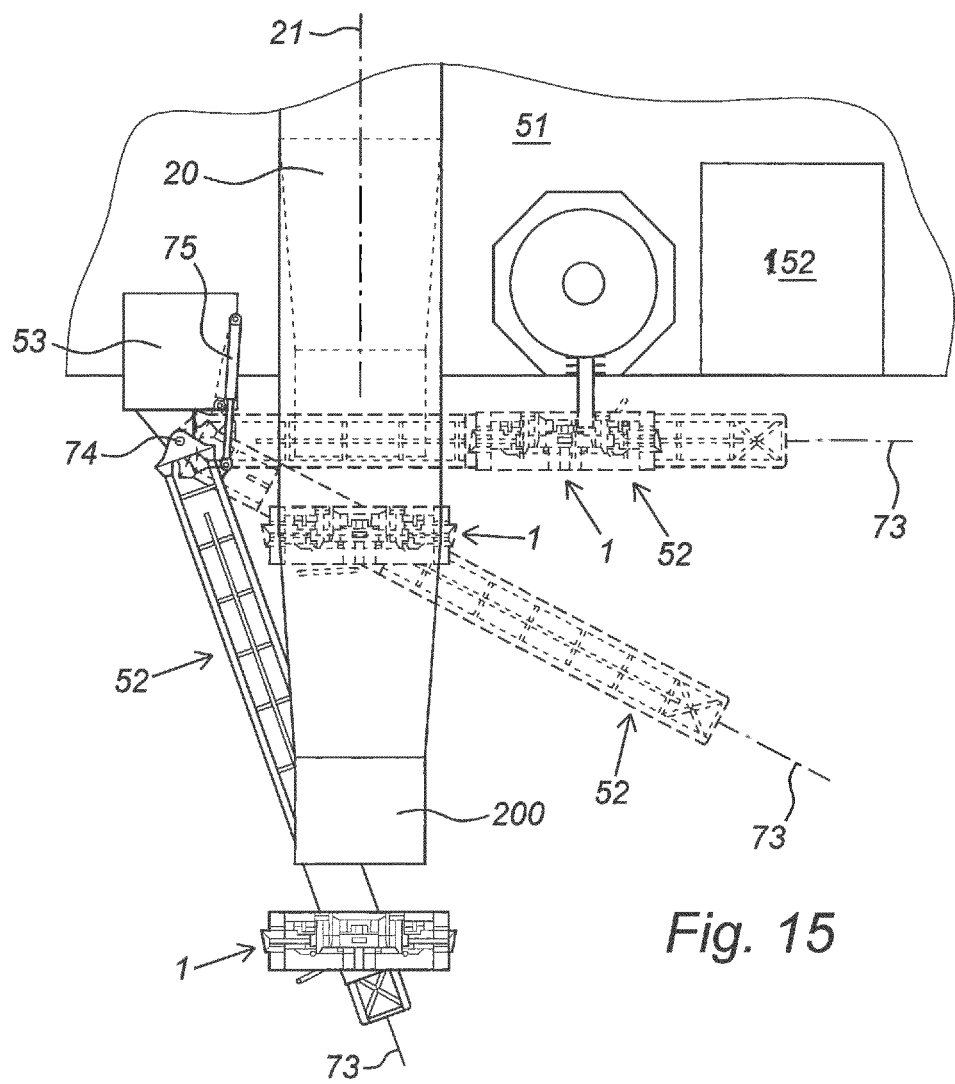
FIG. 15 is a schematic top view of the embodiment of the device according to the invention shown in FIG. 14 in outward-rotated state; and, finally
Figure 16:
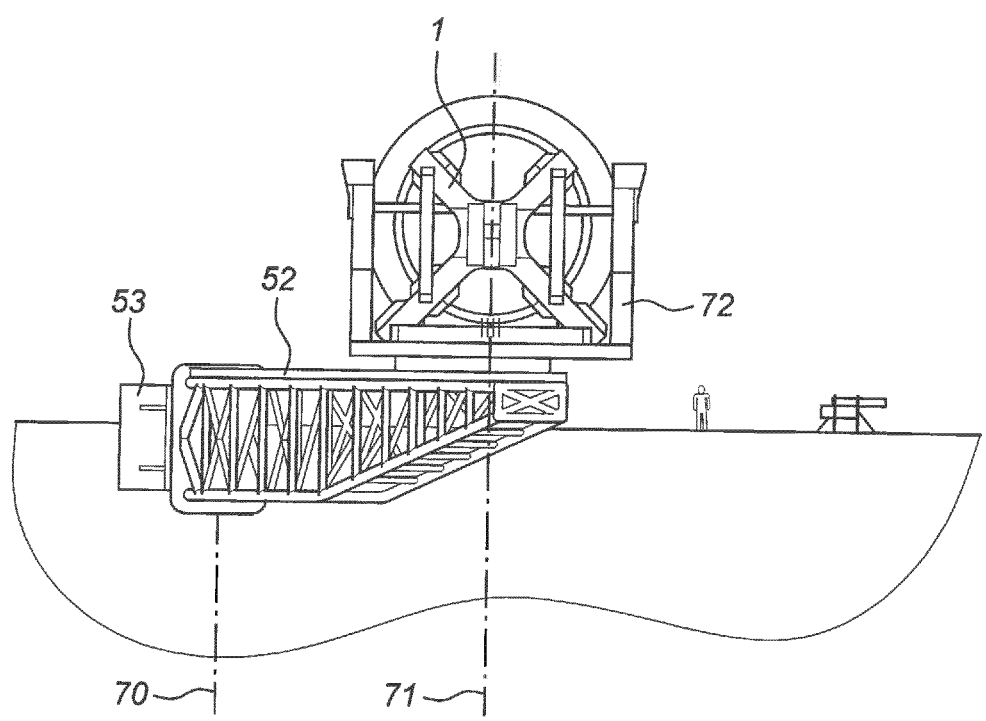
FIG. 16 is a schematic front view of the embodiment shown in FIG. 12.

As further shown in FIG. 15, support beam 52 can be rotated round hinge 74 of support point 53 round the (vertical) axis 70 running perpendicularly of work deck 51, this in a manner such that a foundation pile 20 to be upended lies within reach of the coupling tool 1 arranged on support beam 52. By rotating support beam 52 and coupling tool 1 round their respective axes (70, 71) and also translating coupling tool 1 along support beam 52 relative to support surface 51, this in the longitudinal direction 21 of a foundation pile 20 positioned within reach of support beam 52, coupling tool 1 can be moved from a clear position, in which coupling tool 1 leaves clear the outer end 200 of foundation pile 20, to a coupled position in which the outer end 200 of foundation pile 20 is engaged by coupling tool 1. A possible way of engaging has already been described above.

The rotation of coupling tool 1 and/or support beam 52 relative to work deck 51 can take place in any known manner. For support beam 52 this can for instance take place by means of hydraulic piston cylinder 75 extending between support beam 52 and support point 53.

It is optionally possible to make support point 53 movable relative to work deck 51. In such an embodiment device 150 can be moved to foundation pile 20, or other tubular elements, present on work deck 51 or other support surface. This prevents unnecessary displacement of foundation piles 20 or other tubular elements.

It will be apparent that the above described embodiments have to be provided with peripheral equipment, such as for instance hydraulic and electric power sources, supply conduits therefor, and the like. This peripheral equipment is not described in further detail.

With the embodiment of the invented device, described above in detail, a tubular object, particularly a foundation pile of a wind turbine, and/or a wind turbine tower to be placed on an already installed foundation, can be placed from a floating vessel onto a ground surface, particularly an underwater bottom, this in worse weather conditions than is possible with the known method. This reduces the risk of damage to the tubular object. The device also makes it possible to manipulate tubular elements with relatively large dimensions, wherein different dimensions can be accommodated.

The embodiments illustrated herein are mere examples of the present invention and should therefore not be construed as being limiting. Alternatives provided by a skilled person in consideration of the embodiments are likewise encompassed by the scope of protection of the present invention. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. A device for upending a tubular element, the tubular element defining a longitudinal direction, wherein the device is configured to upend one of outer ends of the tubular elements from a support surface, wherein the device comprises a support beam for supporting a coupling tool, the coupling tool being configured for coupling to a wall part of the outer end of the tubular element, wherein said support beam runs substantially parallel to the support surface and is connected to the support surface at a support point, such that the tubular element to be upended is within reach of the support beam during use, wherein the support beam is configured to guide the coupling tool when supported by the support beam, such that the coupling tool is displaceable relative to the support surface with the support beam from a clear position to a coupled position in which the tubular element outer end is engaged by the coupling tool, wherein the device further comprises a lifting means supported by the support surface, and the coupling tool comprises a lifting member for connection to the lifting means for lifting the outer end of the tubular element so as to upend the same.

2. The device according to claim 1, wherein the support beam is rotatable around the support point and the coupling tool is rotatable around the support beam, around a rotation axis running perpendicularly of the support surface.

3. The device according to claim 2, wherein the coupling tool can be translated along the support beam.

4. The device according to claim 1, wherein the coupling tool can be translated along the support beam.

5. The device according to claim 4, wherein the support beams are fixedly connected to the support points.

6. The device according to claim 4, wherein the coupling tool is connected fixedly to the support beams.

7. The device according to claim 1, wherein the device comprises two support beams which run substantially parallel to the support surface and are connected at support points to the support surface, and which are placed at an intermediate distance from each other such that the tubular element to be upended can be positioned between and parallel to the support beams, wherein the support beams guide the coupling tool, and wherein the coupling tool can be translated relative to the support surface in the longitudinal direction of the tubular element positioned between the support beams, from the clear position to the coupled position.

8. The device according to claim 7, wherein the support beams are connected to the support points for translation in the longitudinal direction of a tubular element positioned between the support beams.

9. The device according to claim 1, wherein the coupling tool and/or the support beam are translatable relative to the support surface by means of hydraulic piston cylinders extending between the coupling tool and/or the support beams, and the support surface.

10. The device according to claim 1, wherein the support beam comprises a lattice structure.

11. The device according to claim 1, wherein the support beam is configured to carry substantially only the coupling tool.

12. The device according to claim 1, wherein the coupling tool comprises a cross-shaped support structure of mutually coupled beams; the lifting member, connected pivotally to the support structure, for connection to the lifting means such as a crane; and clamping members slidable along the mutually coupled beams from a clear position to a clamping position, in which clamping position the mutually coupled beams extend substantially transversely of the longitudinal direction of the tubular element, wherein the clamping members are slidable from the clear position to a clamping position, located further away from a centre of the cross of the support structure than the clear position, for coupling to an internal wall part of a hollow outer end of the tubular element.

13. The device according to claim 1, wherein the support surface comprises a work deck of a floating vessel.

14. The device according to claim 1, wherein the tubular element is a foundation pile of a wind turbine.

15. An assembly comprising the device according to claim 1 and a tubular element coupled to the device.

16. A method for upending a tubular element with a longitudinal direction from a support surface at an outer end of the tubular element, wherein the method comprises the steps of:
- positioning a tubular element to be upended parallel to the support surface, within reach of a support beam which runs substantially parallel to the support surface and is connected to the support surface at a support point;
- displacing a coupling tool, which is configured for coupling to a wall part of an outer end of the tubular element, relative to the support surface under guidance of the support beam supporting the coupling tool, wherein the coupling tool is displaced from a clear position to a coupled position
- engaging of the tubular element outer end by the coupling tool for the purpose of coupling; and
- lifting the outer end of the tubular element by taking up the coupling tool engaged with the tubular element outer end with a lifting means for the purpose of upending.

17. The method according to claim 16, wherein the support beam is rotated around the support point and the coupling tool is rotated around the support beam, around a rotation axis running perpendicularly of the support surface.

18. The method according to claim 16, wherein the coupling tool is translated along the support beam.

19. The method according to claim 16, comprising a device for upending the tubular element, the device comprising two support beams which run substantially parallel to the support surface and are connected at support points to the support surface, and which are placed at an intermediate distance from each other such that a tubular element to be upended can be positioned between and parallel to the support beams, wherein the support beams guide the coupling tool, and wherein the coupling tool is translated relative to the support surface in the longitudinal direction of a tubular element positioned between the support beams, from the clear position to the coupled position.

20. The method according to claim 16, further comprising the step of lifting the tubular element coupled to the device into a desired position and uncoupling the coupling tool from the tubular element outer end.

* * * * *